Sept. 19, 1939. N. KATAJA 2,173,437
HANDLE CONSTRUCTION AND CONNECTION
Filed March 15, 1937 2 Sheets-Sheet 1
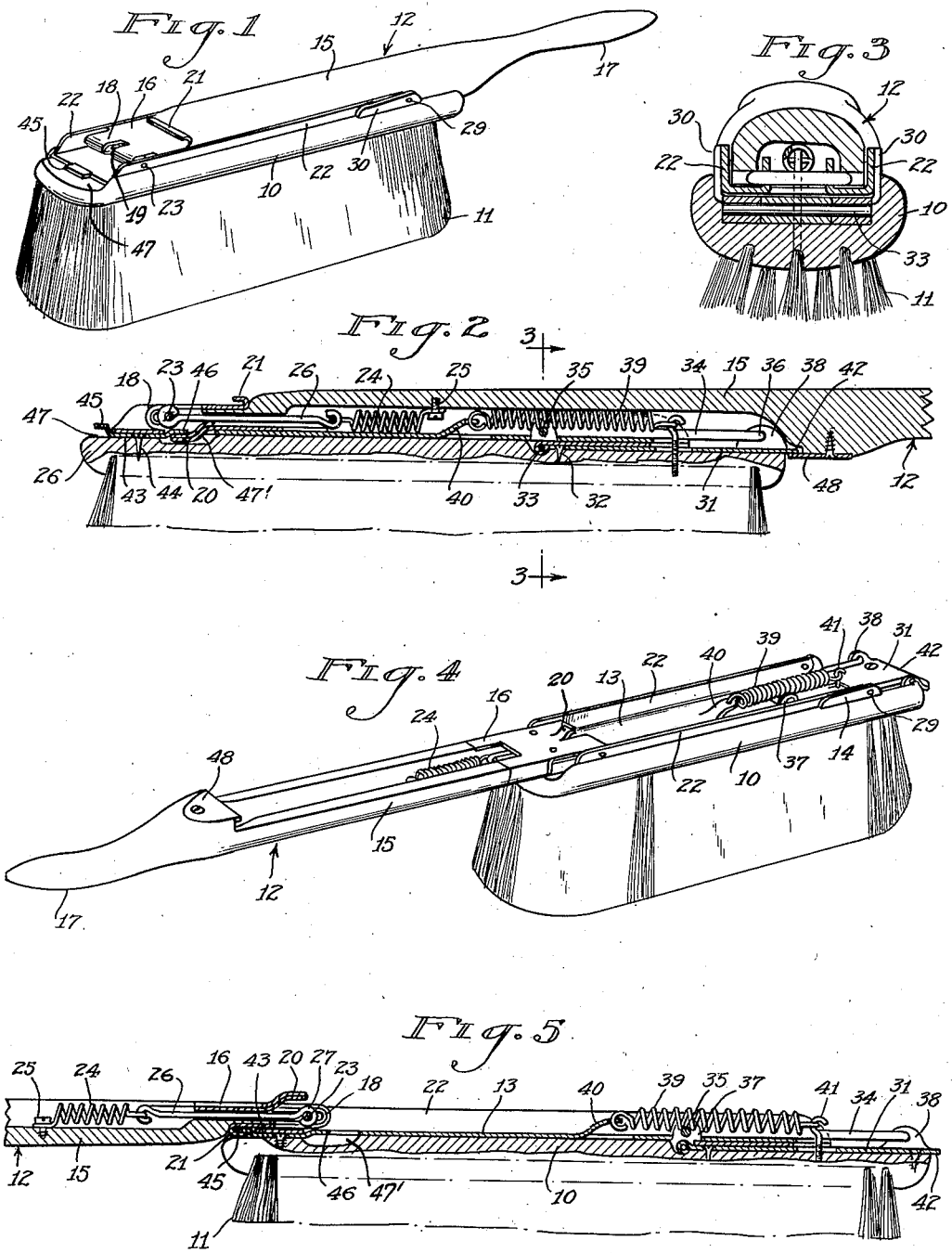
Niilo Kataja
INVENTOR
BY Victor J. Evans & Co.
ATTORNEYS Sept. 19, 1939.   N. KATAJA   2,173,437
HANDLE CONSTRUCTION AND CONNECTION
Filed March 15, 1937   2 Sheets-Sheet 2
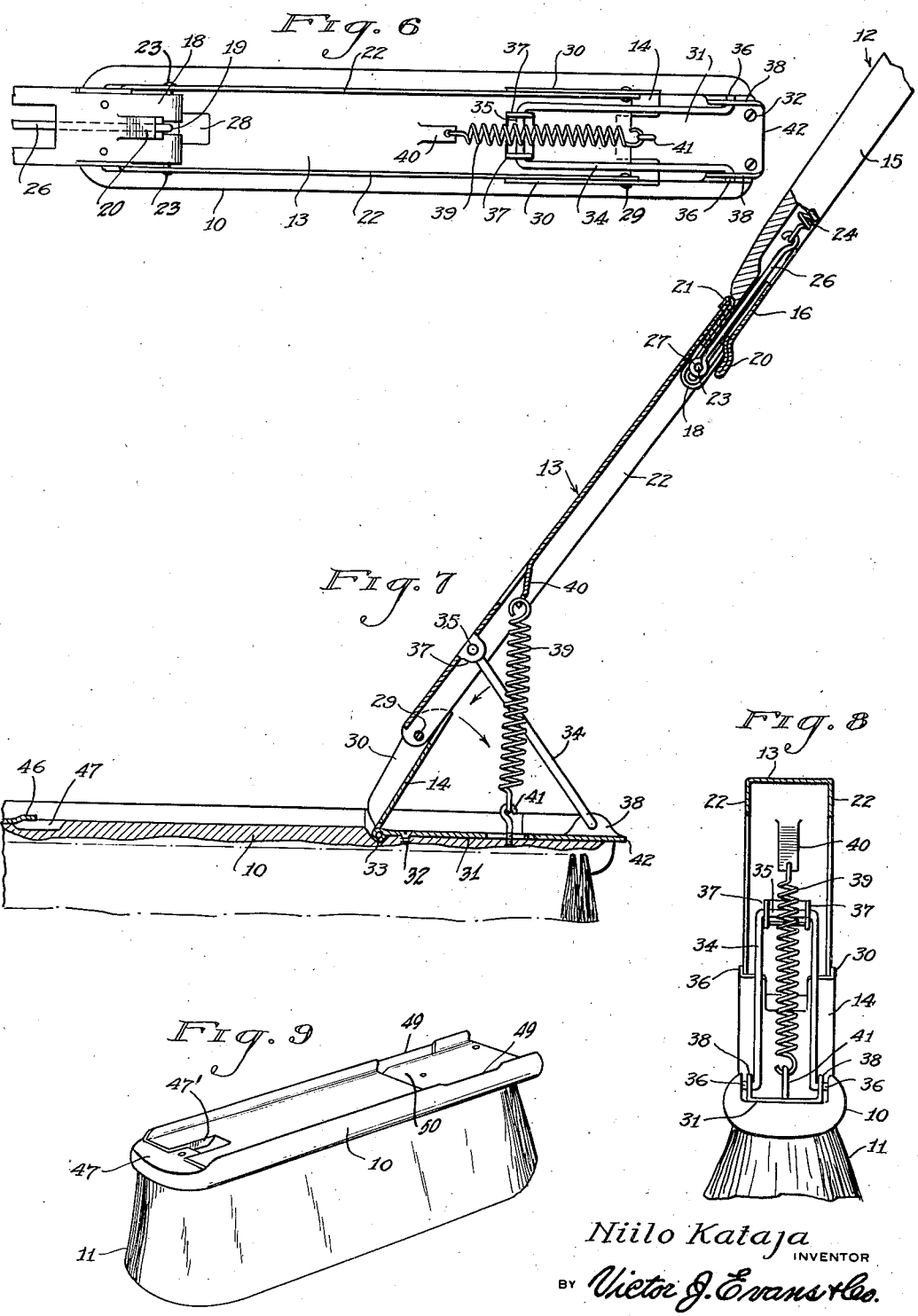
Niilo Kataja
INVENTOR
BY Victor J. Evans & Co.
ATTORNEYS Patented Sept. 19, 1939

2,173,437

UNITED STATES PATENT OFFICE 2,173,437

HANDLE CONSTRUCTION AND CONNECTION

Niilo Kataja, Mount Vernon, N. Y.

Application March 15, 1937, Serial No. 131,093

9 Claims. (Cl. 15—144)

This invention relates to a handle construction and connection which may be employed advantageously in conjunction with cleaning implements, such as brushes, and analogous implements.

The principal object of the invention is the provision of a handle for an implement of the indicated character, which may be readily adjusted to different lengths and positions, so that it may be conveniently used under different circumstances while carrying out cleaning operations.

A further object of the invention is the provision of a handle construction and connection which may be detached so as to be re-usable with new cleaning implements as others with which the device is used become worn and useless.

A further object of the invention is to provide a handle construction to enable the use of a cleaning implement in the home and elsewhere for carrying out cleaning operations on floors, stairways, under furniture, and other places hard to reach, and for cleaning ceilings and walls.

With the foregoing and other objects in view the invention resides in the combinations, constructions and functions of the parts illustrated in the accompanying drawings, described in the following specification, and defined in the appended claims.

In the drawings:

Fig. 1 is a perspective view of a cleaning implement in the form of a brush selected to illustrate the handle construction and connection of the present invention applied thereto, the handle being folded so as to be relatively short.

Fig. 2 is a longitudinal section with the parts of the handle and connection disposed as shown in Fig. 1.

Fig. 3 is a section on the line 3—3 of Fig. 2.

Fig. 4 is a perspective view showing the handle partly unfolded to provide the brush with a handle longer than that shown in Fig. 1 so as to adapt the brush for cleaning under furniture and other places hard to reach.

Fig. 5 is a longitudinal section with disposition of the parts as shown in Fig. 4.

Fig. 6 is a plan view with the parts disposed as shown in Figs. 4 and 5.

Fig. 7 is a longitudinal section of the handle fully unfolded to give it a maximum length for carrying out cleaning and dusting operations on floors, ceilings and walls.

Fig. 8 is an end view partly in section showing certain parts disposed as in Fig. 7.

Figure 9 is a perspective view of the brush and illustrates the manner in which the top of the back thereof is shaped to fittingly receive parts of my handle construction.

Referring now more particularly to the drawings, it will be apparent, that there is shown a cleaning implement in the form of a brush consisting of a rigid back 10, and bristles 11. The back 10 in the present instance is preferably of wood and is of oblong shape. The back 10 at the top is recessed longitudinally thruout its length. The handle construction and its connecting means of the present invention are employed in conjunction with the brush hereinabove described.

The handle of the present invention consists of a plurality of main parts or sections which are articulated. The handle sections consist of an outer section 12, an intermediate section 13 and an inner or root section 14. The outer handle section 12 in the present instance consists of a portion 15 made of wood and a metal portion 16. The wooden portion 15 is hollowed out for a portion of its length and the outer extremity is designed to provide a hand grip 17. The portion 16 of the section 12 is developed from a single piece of metal to provide a loop or a longitudinally slotted end 18, with a notch 19 therein, a lip catch member 20 on one side, and hook catch member 21 on the opposite side. Said portion 16 is rigidly secured to the wooden portion 15 in any suitable manner. The intermediate handle section 13 is made of metal and is of channel formation to provide longitudinal flanges 22. A pivot 23 is mounted in the flanges 22 at one end of the section 13 for disposal in bridging relation thereto. The slotted end 18 of the handle section 12 is mounted on the pivot 23 which extends thru said end, the latter overlapping the adjacent end of the section 13. In this manner the handle section 12 is articulated or pivotally connected with the section 13 and is also permitted to have a limited amount of sliding or longitudinal movement with respect to said section 13, for a purpose to appear hereinafter. By overlapping the adjacent end portions of the sections 12 and 13, the former has a limited amount of pivotal movement with respect to the section 13 so that both sections may be maintained longitudinally straight with respect to each other. A contractile coil spring 24 has one end thereof connected with the section 12 as at 25 and its opposite end is connected with one end of a link 26 whose opposite end is pivotally connected with the pivot 23, as at 27. The spring 24 constitutes resilient means having a normal tendency to constantly urge the section 12 endwise toward the section 13 and for retaining the catch member 21 in engagement with the adjacent end portion of the section 13, to retain the sections 12 and 13 in the longitudinally straight relationship. The section 13 has an opening 28 therein to allow the catch member 29 to project therethru when the handle section 12 is folded against the section 13, for a purpose to appear hereinafter. The root section 14 is of channel formation and is articulated with the inner end of the intermediate section 13 for pivotal or swinging movement with respect thereto by means of a pivot 29 mounted in the flanges 30 of the section 14 and the flanges 22 of the section 13. The adjacent ends of the sections 13 and 14 overlap each other to provide a stop in order to limit the pivotal movement of these sections with respect to each other to a substantially longitudinally straight line relationship as clearly shown in Figure 7.

In order to connect the handle constructed as hereinabove described with the back 10 for movement to different positions of adjustment with respect thereto while the handle is folded to decrease its length or unfolded to increase its length, there is provided means presently described. A metal plate 31 is fixed to the upper surface of the back 10 at one end thereof in any suitable manner, such as by the screws 32. The root section 14 of the handle is hingedly or pivotally connected as at 33 with the inner end of the plate 31. Use is made of a prop 34. This prop in the present instance is constructed from a single piece of cross-sectionally round stock or stout wire bent upon itself into a substantially U-shape to provide a pivot 35 on one end and axially aligned terminals 36 constituting pivot means on the other end of the prop. The pivot 35 is received in apertured lugs 37 upstuck from the material of the handle section 13, and the terminals 36 are received respectively in apertured lugs 38 formed integral with the plate 31 at the outer end thereof. The pivotal connection of the prop 34 with the handle section 13 is outwardly beyond the pivotal connection between the sections 13 and 14. A contractile coil spring 39 has one end thereof connected with the handle section 13 by a lug 40 integral with the section 13 and the opposite end of the spring is connected with the back 10 by means of a hook 41 secured to the back 10. The outer end of the plate 31 projects beyond the back 10 to provide a catch 42 for a purpose to appear. At the other end of the back 10 there is secured a metal strip 43 by means of a screw or the like 44. The opposite ends of the strip 43 are offset upwardly to provide catch members 45 and 46, respectively, for a purpose to be explained. The back 10 is recessed beneath the catch members 45 and 46, as at 47 and 47', to enable engagement of the catch members 45 and 46 in a manner and for a purpose to be explained, the recesses being clearly shown in Figure 9, which likewise illustrates that the back is also recessed as at 49 and 50 to accommodate the flanges 30 and the hinge 33 respectively of the root section 14. The handle section 12 has a catch member 48 secured thereto for engagement with the projection 42.

From the foregoing it will be understood that the handle sections 12, 13 and 14 may be folded in order to decrease the length of the handle. When the handle sections 12, 13 and 14 are folded, the root section 14 will lie against the plate 31, the intermediate section 13 will lie partly on the section 14 and on the back 10, while the outer section 12 will overlie the sections 13 and 14, and it will be obvious from Figures 1 and 2 that the sections are shaped and of a width for nested relation with each other and with the back when in folded position. The intermediate section 13 is of such length as to reach from its pivotal connection with the section 14 to the end of the back 10 having the element 43. The handle section 12 is of such length as to extend from the end of the back 10 having the element 43 to a point beyond the opposite end of the back 10, so that the hand grip 17 will be conveniently disposed as shown in Fig. 1. Due to the hollow construction or channel formation of the handle sections the springs 24 and 39 together with the prop 34 will be nested within the sections. By imparting longitudinal movement of the handle section 12 by virtue of the slotted end 18, the catch members 20 and 48, respectively, of the handle section 12 may be engaged with the catch members 46 and 42, respectively, subject to the action of the spring 24, to releasably retain the handle in folded condition, thereby providing a relatively short handle for the brush. The brush with the handle folded as indicated presents a cleaning implement which may be used for carrying out cleaning operations in places easily reached.

The handle section 12 may be readily disengaged by imparting longitudinal movement thereto subject to the tension of the spring 24, to disengage the catch members 20 and 48 from the catch members 46 and 42, respectively. By pulling outwardly on the handle section 12 against the action of the spring 24, the section 12 may be swung on the pivot 23 with respect to the handle section 13 so that these sections will be in longitudinal alignment. The catch member 21 on the handle section 12 may then be engaged with the catch member 45 on the back 10 by exerting an outward pull on the handle section 12 against the action of the spring 24. The spring 24 reacts to releasably retain the catch members 21 and 45 engaged, thereby holding the partly folded handle of somewhat greater length in fixed relation to the back, as shown in Fig. 4. The brush is then adapted for conveniently cleaning in places difficult to reach, such for instance as places beneath furniture and other articles, to remove dust and dirt from beneath the same.

With the disposition of the parts as illustrated in Figs. 4 and 5, by exerting an outward pull on the handle section 12 the catch member 21 may be disengaged from the catch member 45, whereupon the handle sections 12 and 13 in unison may be swung on the pivotal connection between the section 13 and section 14. By virtue of the pivotal movement of the section 14 with respect to the plate 31, all three sections of the handle may be brought into substantially straight line relationship to provide a handle of maximum length inclined with relation to the back 10 as illustrated in Fig. 7. The prop 34 limits the pivotal movement of the several sections in unison so that they will be disposed in the inclined position mentioned. The spring 39 cooperates with the prop 34 to releasably retain the handle in this unfolded condition extended to a maximum length. The handle thus unfolded adapts the brush for carrying out cleaning operations on floors, ceilings and walls.

From the foregoing it will be clear that there is described a handle construction and connection by means of which the objects of the invention may be readily attained. It is understood that the sizes of the parts may be varied, and that minor details of construction may be modified and re-arranged according to the spirit of the invention as defined in the claims.

What is claimed as new and useful is:

1. The combination with a cleaning implement having a rigid back, of a handle consisting of articulated sections foldable upon each other to reduce the length of the handle and unfoldable to increase its length, means connecting the root section of said handle with said back for pivotal movement with respect thereto, said root section and an adjoining section being disposed in overlapped relation to provide a stop to limit the movement thereof relative to each other, a prop member, means connecting one end of the said member with said back for pivotal movement with respect thereto, means connecting the other end of said member with a handle section beyond the root section thereof, said prop member limiting the pivotal movement of the handle in one direction with respect to said back to dispose the handle in an inclined position, and spring means connected with said handle beyond said root section and with said back and cooperating with the stop and prop member to retain the handle in the inclined position.

2. A foldable handle for a cleaning implement including two sections, a pivot carried by one of said sections and extending transversely thereof, the other section having one end thereof slidably engaged with said pivot so that said second section may have pivoting and sliding movement with respect to said first section, a contractile spring having its opposite ends connected with said pivot and second section, and a catch member on said second section engageable with the first section for holding the sections extended in substantially straight line relation, said spring serving to retain said catch member in engaged position for the stated purpose, and permitting said catch member to be disengaged, subject to the sliding movement of said second section, whereby the latter may be folded over the first section and means for connecting the first mentioned section to the implement.

3. The combination of a plate adapted to be fixed to the back of an implement, a handle foldable to decrease the length thereof and unfoldable to increase the length thereof, a connection between said plate and the root end of the handle whereby the handle may be moved into different positions of adjustment with respect to said plate, a catch member fixed on said back, and cooperative means on said plate and the handle cooperating in conjunction with said catch member to retain the handle in folded condition with respect to said plate.

4. The combination with a cleaning element having a rigid elongated back, of a handle consisting of pivotally connected sections foldable to decrease the length of the handle and unfoldable to increase its length, means included in one of said pivotal connections to permit longitudinal movement of one of said handle sections, a contractile spring having its opposite ends connected with said longitudinally movable handle section and an adjoining handle section respectively, catch members affixed on the opposite ends of said back respectively, a pivotal connection between the root end of the handle and said back, and spaced catch members on said longitudinally movable handle section and engageable with said first mentioned catch members respectively, subject to the action of said spring, whereby said handle may be retained in folded and unfolded relation with respect to said back.

5. The combination with a cleaning implement having a rigid back, of a plate fixed to the back, a handle foldable to decrease its length and unfoldable to increase its length, a connection between said plate and handle whereby the latter may be moved into different adjusted positions with respect to said back, catch members on said plate and back respectively, and means on said handle and cooperating with said catch members to retain the handle folded with respect to said plate and back.

6. The combination with a cleaning implement having a rigid back, of a foldable sectional handle including a root section having one end pivotally connected to the back and its other end to an adjoining handle section, said root section and adjoining section being disposed in end to end overlapped association to provide a stop to limit the pivotal movement thereof in a longitudinal aligned position, a substantially U-shaped member of a length greater than that of the root section and having its ends pivotally secured to the adjoining section and the back respectively to provide a prop for the handle, a spring between the adjoining section and the back and cooperating with the prop and stop for holding said sections in aligned position and at an angle to the back, a hand gripping section pivotally secured to the adjoining section, releasable means for holding the hand gripping section aligned with the adjoining section, all of said sections being movable on their pivots to folded position for disposal substantially parallel to the back, and co-acting means on the back and the handle gripping section respectively for detachably securing all of the sections in folded position to said back.

7. The combination with a cleaning implement having a rigid back, of a foldable handle section including a root section having one end pivotally connected to the back and its other end to an adjoining handle section, said root section and adjoining section being disposed in end to end overlapped association to provide a stop to limit the pivotal movement thereof in a longitudinal aligned position, a prop of a length greater than that of the root section and pivotally secured to the adjoining section and back respectively, a spring between the adjoining section and the back and cooperating with the prop and stop for holding said sections in said aligned position and at an angle to the back, a hand gripping section pivotally secured to the adjoining section, releasable means for holding the hand gripping section aligned with the adjoining section, all of said sections being movable on their pivots to folded position for disposal substantially parallel to the back, co-acting means on the back and the hand gripping section for detachably securing all of the sections in folded position to the back, all of said sections being shaped for disposal one upon the other for nested relation with each other when in folded position, and the back being recessed to receive the sections therein with the hand gripping section extending from one end of the back.

8. The combination with a cleaning implement having a rigid back, of a foldable sectional handle including a root section having one end pivotally connected to the back, an intermediate section pivotally connected to the opposite end of the root section and disposed in end to end overlapped association therewith to provide a stop to limit the pivotal movement thereof in longitudinal alignment with the root section, a prop of a length greater than that of the root section and pivotally secured to the intermediate section and the back respectively, a spring between the intermediate section and the back and cooperating with the prop and stop for holding the sections in said aligned position and at an angle to the back, an end section including a hand gripping portion and pivotally connected to the intermediate section for disposal in alignment therewith, said sections being movable on their pivots to folded position one upon the other for disposal substantially parallel to the back, means for detachably securing the sections in folded position to said back, and means for holding said end section aligned with the intermediate section in the angular position of the root and intermediate section and when the latter sections are secured to the back.

9. The combination with a cleaning implement having a rigid back, of a foldable sectional handle including a root section having one end pivotally connected to the back, an intermediate section pivotally connected to the opposite end of the root section and disposed in end to end overlapped association therewith to provide a stop to limit the pivotal movement thereof in longitudinal alignment with the root section, a prop of a length greater than that of the root section and pivotally secured to the intermediate section and the back respectively, a spring between the intermediate section and the back and cooperating with the prop and stop for holding the sections in said aligned position and at an angle to the back, an end section including a hand gripping portion and pivotally and slidably connected to the intermediate section for disposal in alignment therewith, said sections being movable on their pivots to folded position one upon the other for disposal substantially parallel to the back, companion catch means carried by the end section and back respectively for detachably securing the sections in folded position to said back, catch means carried by the end section and engaged with the intermediate section for holding the end section aligned therewith, spring means between the end section and intermediate section for holding all of the catch means in operative position, and all of said catch means being releasable upon slidable movement of the end section against the action of the spring means.

NIILO KATAJA.